(12) United States Patent
Ostermann et al.

(10) Patent No.: US 6,737,090 B2
(45) Date of Patent: *May 18, 2004

(54) CARBON-CONTAINING ADDITIVE FOR FOODSTUFF FERMENTATIONS AND FOOD COMPOSITIONS CONTAINING IT

(75) Inventors: Elsa Ostermann, Bethune (FR); Bernard Pora, Arleux (FR); Bernard Boursier, Violaines (FR); Sophie Defretin, Locon (FR)

(73) Assignee: Roquette Freres, Lestrem (FR)

( * ) Notice: Subject to any disclaimer, the term of this patent is extended or adjusted under 35 U.S.C. 154(b) by 116 days.

This patent is subject to a terminal disclaimer.

(21) Appl. No.: 09/999,862

(22) Filed: Oct. 23, 2001

(65) Prior Publication Data

US 2002/0136798 A1 Sep. 26, 2002

(30) Foreign Application Priority Data

Oct. 30, 2000 (FR) .............................. 00 13957

(51) Int. Cl.$^7$ ................................. A23C 9/12
(52) U.S. Cl. ......................... 426/34; 426/48; 426/580
(58) Field of Search .............................. 426/34, 36, 42, 426/44, 48, 49, 580, 582, 583

(56) References Cited

U.S. PATENT DOCUMENTS

| 5,886,168 A | 3/1999 | Brumm |
| 6,248,726 B1 | 6/2001 | Alsop et al. |

FOREIGN PATENT DOCUMENTS

| EP | 0667356 | 8/1995 |
| EP | 1006128 | 6/2000 |
| EP | 1006128 A1 * | 6/2000 |
| WO | WO9502969 | 2/1995 |
| WO | WO9927801 | 6/1999 |

OTHER PUBLICATIONS

"Que sont les bactéries lactiques?" H.B. De Roissart, *La technique laitière*, vol. 979, Sep. 1983, pp. 41–47.

* cited by examiner

Primary Examiner—Leslie Wong

(57) ABSTRACT

The invention concerns a carbon-containing additive for food fermenting agents characterized in that it comprises branched maltodextrins having between 15 and 35% of 1→6 glucosidic bonds, a reducing sugars content less than 20%, a polymolecularity index less than 5 and a number average molecular mass Mn equal to at most 4,500 g/mole. It also concerns fermented food compositions containing the said additive as well as the process for preparing these fermented food compositions.

6 Claims, 1 Drawing Sheet

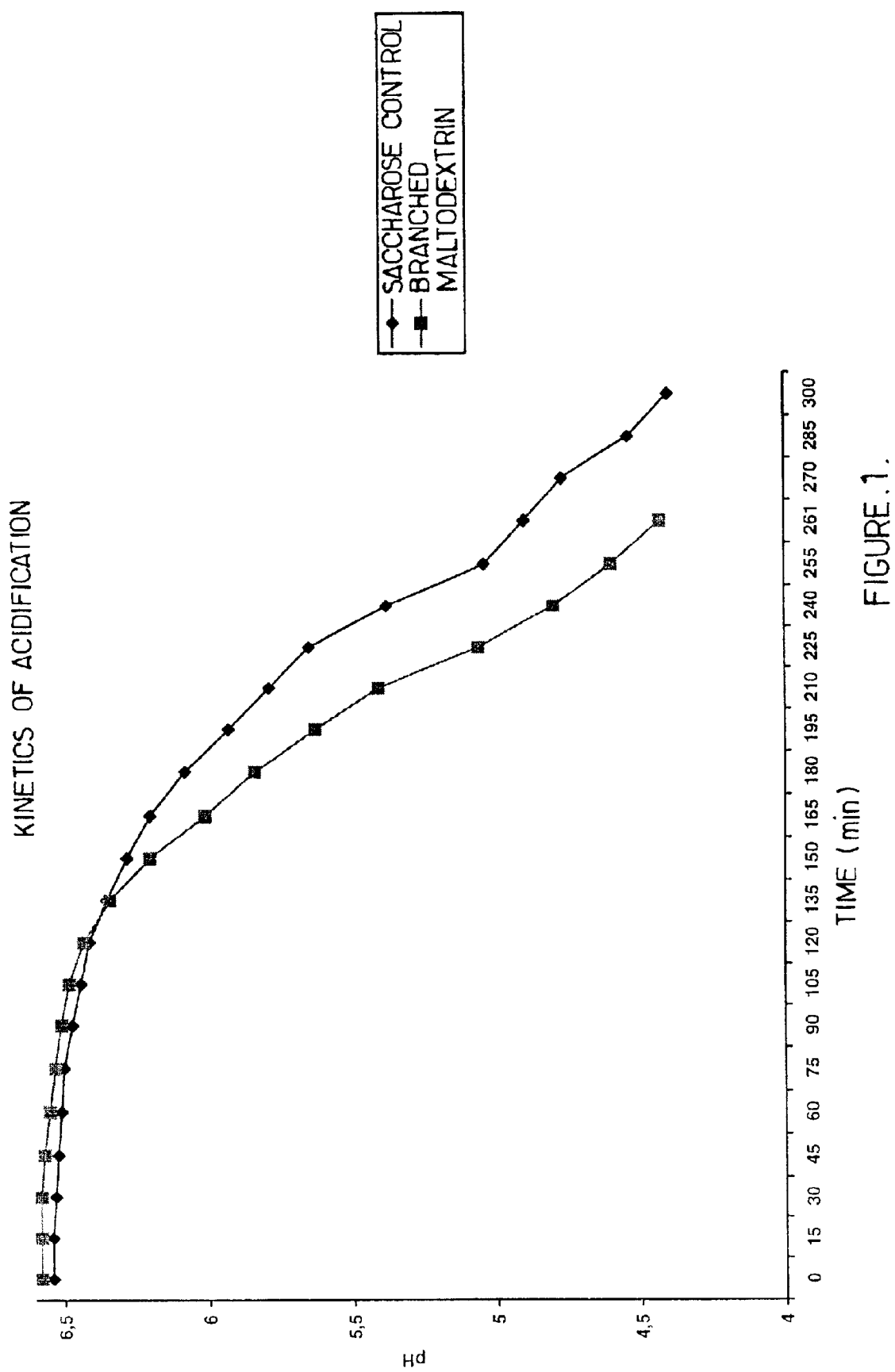

CARBON-CONTAINING ADDITIVE FOR FOODSTUFF FERMENTATIONS AND FOOD COMPOSITIONS CONTAINING IT

FIELD OF THE INVENTION

The subject of the present invention is a carbon-containing additive for fermentations or for lactic and/or bifidus food fermenting agents containing branched maltodextrins. Its subject is also fermented food compositions produced in the presence of the said carbon-containing additive or containing it.

BACKGROUND OF THE INVENTION

The foodstuff fermentations to which the present invention is directed are fermentations using Gram-positive bacteria, among which are to be found the lactic bacteria characterised by the production of a large amount of lactic acid, and the bifidus bacteria which are similar to the lactic bacteria and are characterised by mixed lactic and acetic fermentation.

The lactic bacteria comprise the following genus types: Lactobacillus, Lactococcus, Streptococcus, Enterococcus, Leuconostoc and Pediococcus. The bifidus bacteria are represented by the Bifidobacterium genus.

These bacteria are generally found associated with other micro-organisms in numerous naturally fermented animal and vegetable products: fermented milks (cheeses, yoghurts), fermented meats (sausage, ham), fruit-based alcoholic beverages (wines, ciders, beers), fermented fruits and vegetables (sauerkraut, olives, gherkins), fermented cereals (various kinds of bread) and fermented fodder (silage).

These bacteria, which are collectively known as "foodstuff fermenting agents", are considered to be one of the groups of bacteria that are the hardest to please from the nutritional point of view (La technique laitière No. 979, 1983- pp. 41–47).

SUMMARY OF THE INVENTION

While studying various growth media for foodstuff fermenting agents, and in particular the different carbon-containing materials that are usable, the Applicant observed that the addition of particular branched maltodextrins has, in a surprising and unexpected manner, a beneficial effect on the growth of the foodstuff fermenting agents and consequently on the rate of acidification of the growth medium. This is particularly astonishing because it is known that low molecular weight carbon sources such as lactose in particular are preferentially metabolised by the lactic bacteria. According to the invention, the addition of branched maltodextrins to the growth medium or to the product to be fermented enables:

a reduction in the latent period of bacterial growth,
faster acidification with a saving in the fermentation time necessary to obtain a pH of 4.4,
a bacterial population 2 to 4 times greater in number and having increased viability.

This phenomenon is very attractive in foodstuff fermentations, especially those of the "yoghurt" type, since the Applicant has observed, in addition to the above advantages, an increase in the viscosity of the yoghurt that is beneficial to the rheology of the final product. Moreover, this viscosity increase allows an advantageous reduction in the concentration of texturing agents in the product, such as proteins in particular.

BRIEF DESCRIPTION OF THE DRAWING

FIG. 1 shows the acidification kinetics (y-axis: pH; x-axis: time in min) for branched maltodextrin (grey square), compared to saccharose (sucrose) control (black lozenge).

DETAILED DESCRIPTION OF THE INVENTION

Thus the subject of the invention is a carbon-containing additive for fermentations or for food fermenting agents characterised in that it comprises branched maltodextrins having between 15 and 35% of 1→6 glucosidic bonds, a reducing sugars content less than 20%, a polymolecularity index less than 5 and a number average molecular mass Mn equal to at most 4,500 g/mole.

The polymolecularity index means the ratio Mp/Mn where Mp is the molecular mass by weight and Mn is the number molecular mass. Branched maltodextrins mean those maltodextrins that are described in Patent Application FR-A-2,786,775 of which the Applicant is the owner. These maltodextrins have a content of 1→6 glucosidic bonds greater than that of standard maltodextrins.

Standard maltodextrins within the meaning of the present invention are classically produced by acidic or enzymatic hydrolysis of starch and are characterized by a reducing power expressed as Dextrose Equivalent (or D.E.) of less than 20.

According to a preferred variant of the invention, the branched maltodextrins have a reducing sugars content between 2 and 5% and an Mn between 2,000 and 3,000 g/mole.

Advantageously, the carbon-containing additive according to the invention comprises at least 0.1% of branched maltodextrins. It can also contain standard maltodextrins.

The carbon-containing additive according to the invention comprises 0.1 to 100%, preferably 2 to 90% and even more preferably 5 to 85% by weight of branched maltodextrins and possibly 0.1 to 99.9%, preferably 5 to 75% and even more preferably 5 to 55% by weight of standard maltodextrins.

Below 0.1% of maltodextrins in the fermentation medium, the beneficial effect is not sufficient to be demonstrated. Beyond 30% by weight of maltodextrins in the said medium, a detrimental effect is observed as a result of an excessive osmotic pressure.

According to a variant of the invention, all or part of the branched maltodextrins are hydrogenated.

The carbon-containing additive can also contain intense sweeteners such as, for example, aspartame or acesulfame K.

The carbon-containing additive according to the invention can be added to the fermentation medium as a powder or in the form of paste, suspension or solution; on its own or in combination with other products constituting the fermentation medium or with the fermenting agents.

The fermented food compositions according to the invention are characterised in that they contain all or part of the carbon-containing additive according to the invention. In fact the maltodextrin compound, depending on whether it is branched, branched hydrogenated or standard, is not basically fermented or partially fermented and thus reappears almost entirely or partially in the final foodstuff composition. In the case of yoghurts or fermented milks, the carbon-containing additive is incorporated directly into the milk that is to be fermented. The fermented food compositions at which the present invention is directed can be of animal or vegetable origin and can also be intended for animal nutrition, particularly as silage-making compositions.

Another subject of the present invention is a process for manufacturing a fermented food composition characterised in that it uses the carbon-containing additive according to the invention.

Thus it is possible to obtain, with better fermentation yields, various food products in which the presence of the carbon-containing additive according to the invention also imparts other technological and organoleptic benefits. In particular, the branched maltodextrins used according to the invention confer a fibre effect to the food products. In fact the Applicant has shown that these maltodextrins favour the development of micro-organisms that are beneficial to human and animal health, such as the bifidogenic and lactic flora etc. Thus the branched maltodextrins are said to have a prebiotic effect. Therefore the food composition comprising the carbon-containing additive according to the invention will have the additional advantage of being bifidogenic. Thus the additive according to the invention can favour the growth of human or animal lactic flora in vivo. Other benefits will be clearly apparent on reading the following examples and the single figure associated with it, which are intended to be illustrative and non-limiting.

Of course the carbon-containing additives according to the invention can equally well be associated with the foodstuff fermenting agents themselves, which has the advantage of improving their storage stability and drying stability.

EXAMPLE 1

Preparation of Stirred Dairy Specialities

The aim is to demonstrate the influence of the carbon-containing additive according to the invention on the texture, taste and fermentation kinetics of sweetened dairy specialities with 0% fat content. To do this, the Applicant replaced all the saccharose (sucrose) by branched maltodextrins according to the invention and synthetic sweeteners, with various fermenting agents:

- a "traditional" fermenting agent, a balanced mixture of the usual yoghurt cultures (*Streptococcus thermophilus, Lactobacillus delbruekii* sp. bulgaricus)
- A "modern" fermenting agent composed of the same cultures after adjustment to current consumer expectation (less acidity, increased creaminess),
- a bifidogenic fermenting agent consisting solely of Bifidobacterium lactis.

The yoghurts are prepared according to the following recipe and formulation.

| Ingredient | Control yoghurt | Yoghurt of the invention |
| --- | --- | --- |
| Water | 81% | 80.96% |
| Skimmed milk powder | 9% | 9% |
| Saccharose (sucrose) | 10% | |
| Branched maltodextrins* | | 10% |

-continued

| Ingredient | Control yoghurt | Yoghurt of the invention |
| --- | --- | --- |
| Aspartame | | 0.024% |
| Acesulfame K | | 0.016% |
| Fermenting agents (see below) | | |

*The branched maltodextrins used have the following properties:
Dextrose equivalent: 6
Dry matter: >95%
Molecular mass Mn: 2900
Calorific value: 2 kcal/g The fermenting agents are supplied by the CHR HANSEN Company in a lyophilised (freeze-dried) form designed for direct seeding. The dosage of fermenting agent to be used depends on the type of fermenting agent. Thus about 4.8 g of traditional or modem fermenting agent is used for 100 liters of milk, and 2 g for 100 liters of milk when using the bifidus fermenting agent.

| | |
| --- | --- |
| traditional fermenting agent | Ref. YC-380 |
| modern fermenting agent | Ref. YC-X11 |
| bifidus fermenting agent | Ref. BB-12 |

Recipe:
- Hydrate the skimmed milk powder in water for 15 minutes with stirring (800 rpm).
- Add the saccharose (sucrose) or branched maltodextrins and stir for 7 minutes at 500 rpm.
- Pasteurise the solution in a coiled tube immersed in a hot water bath at boiling point, residence time of the milk in the coiled tube: 7 minutes.
- Allow the milk to cool to 44° C. Then add the sweeteners previously diluted to 10% in sterile water and the diluted fermenting agents. For the traditional and modern fermenting agents, which comprise a mixture of cultures, it is important to dilute at least 50% of lyophilisate in pasteurised milk a few minutes before seeding in order to ensure that good proportions of each culture are withdrawn.
- Put the milk into a hot cabinet at 44° C. and follow the pH to a value of 4.4.
- Stop the fermentation: stir the yoghurt for 1 minute at 500 rpm and pour it into glass jars stored at 4° C.

The parameters measured on the yoghurts are as follows: Brookfield viscosity after fermentation, before and after stirring, acidity in Dornic (lactic acid) degrees before and after fermentation, acidification measured by following the pH during the fermentation. A sensory analysis in the days following manufacture enables the perception of texture and flavour obtained to be assessed. The measurements 1 day after manufacture are summarised in the following Table:

| | Control yoghurt | Yoghurt of the invention |
| --- | --- | --- |
| Traditional fermenting agent | | |
| Initial viscosity (mPa.s) | 10 | 20 |
| Viscosity after fermentation (mPa.s) | 11,000 | 14,000 |
| Viscosity after stirring (mPa.s) | 290 | 410 |
| Initial acidity (°D) | 16 | 16.5 |
| Final acidity (°D) | 73 | 86 |

-continued

|  | Control yoghurt | Yoghurt of the invention |
|---|---|---|
| Modern fermenting agent | | |
| Viscosity after fermentation (mPa.s) | 18,000 | 20,000 |
| Viscosity after stirring (mPa.s) | 440 | 590 |
| Initial acidity (°D) | 14.5 | 12.5 |
| Final acidity (°D) | 80 | 84 |
| Bifidus fermenting agent | | |
| Viscosity after fermentation (mPa.s) | 19,000 | 26,000 |
| Viscosity after stirring (mPa.s) | 560 | 870 |
| Initial acidity (°D) | 13 | 15 |
| Final acidity (°D) | 101 | 86.5 |

A large increase in the viscosity of the yoghurts is observed, regardless of which fermenting agent is used. The measurement of the initial viscosity shows that the viscosity properties of the branched maltodextrins themselves are insufficient to explain the observed differences.

An acidification kinetics is illustrated in the graph of FIG. 1, which shows the beneficial effect of the branched maltodextrins on the speed of acidification.

EXAMPLE 2

Microbiological Study

A yoghurt is prepared under the same conditions as Example 1, using traditional fermenting-agents, and the fermentation is followed by measuring the variation of the impedance of the medium during the incubation period (BACTOMETER®, BIOMERIEUX) and by the quantitative and qualitative determination of the microbial population by flow cytometry (CHEMFLOW®, CHEMUNEX). The BACTOMETER® system is a microbial detection system that is fast, reliable and sensitive and is entirely automated, based on the principles of microbiology by impedance. It is designed to detect the changes in impedance resulting from the metabolic activity of the growing micro-organisms. The detection time is a simultaneous function of the growth kinetics, the latency time and the concentration of micro-organisms in a given sample. The results are expressed in DT (Detection Time). The effect of various saccharides on the growth of the lactic fermentation agents is studied.

The growth medium has a volume of 1 ml, consisting of 9% milk, 10% saccharose (sucrose) and/or 10% of the saccharides to be studied. The milk is prepared by rehydration in sterile water and is not pasteurised. The saccharides to be studied are sterilised by filtration.

The suspension of lactic fermenting agents is prepared in sterile water in order to obtain an initial population of 2×10$^6$ CFU/ml of the milk medium. (CFU =colony-forming units)

Incubation takes place at 44° C. for 24 hours. The variation of the impedance of the medium is measured continuously and converted into a % variation.

The negative medium is a medium of the same composition as the medium studied but is not seeded.

The results are listed in the following Table.

| Added saccharide | Concentration % | Detection time hours |
|---|---|---|
| none | | 4.6 |
| saccharose (sucrose) | 10 | 4.6 |
| glucose | 10 | 14.8 |
| branched maltodextrins | 10 | 4.1 |

This measurement is aimed at showing that the beneficial effect of the branched maltodextrins is not related to a reduction in the osmotic pressure, because the detection time is identical to the control in the absence of a carbon-containing product in addition to milk lactose.

A reduction in the detection time corresponding to a decrease in the latency time is observed for the experiments in which the saccharose (sucrose) was replaced by the branched maltodextrins.

EXAMPLE 3

Determination of the Bacterial Concentration

The lactic fermenting agents were used on the media described in the previous example (milk 9% and saccharose (sucrose) 10%, or branched maltodextrins 10%).

The incubation was carried out at 44° C. in a 2-liter reactor and the acidification kinetics were followed. Samples were taken during the fermentation to determine the total bacterial concentration and the viability of this population by using the CHEMFLOW analyser.

The fermentations were halted as soon as the pH had reached a value of 4.4.

The following Table shows the concentrations of total cells and the concentrations of living cells, the ratio between these two values giving the cellular viability. The analyses of the final samplings corresponding to the ends of the fermentations were carried out after stirring the yoghurt. The values are expressed in cells counted per ml of must.

| Time (hours) | Saccharose (sucrose) | Branched maltodextrins |
|---|---|---|
| | Total cells/living cells | |
| 0 | 1.89 × 10$^8$ | 1.67 × 10$^8$ |
|   | 1.46 × 10$^8$ | 1.33 × 10$^8$ |
| 1 | 3.28 × 10$^8$ | 3.64 × 10$^8$ |
|   | 2.61 × 10$^8$ | 2.98 × 10$^8$ |
| 2 | 3.14 × 10$^8$ | 6.24 × 10$^8$ |
|   | 2.54 × 10$^8$ | 4.88 × 10$^8$ |
| 3 | 5.81 × 10$^8$ | 12.9 × 10$^8$ |
|   | 4.17 × 10$^8$ | 10.5 × 10$^8$ |
| 4 | 7.8 × 10$^8$ | 33.8 × 10$^8$ |
|   | 6.3 × 10$^8$ | 23.3 × 10$^8$ |
| 4.25 | — | 34.1 × 10$^8$ |
|   |   | 22.2 × 10$^8$ |
|   |   | (or 65% at pH = 4.4) |
| 5 | 10.5 × 10$^8$ | — |
|   | 7.2 × 10$^8$ |   |
|   | (or 68% at pH = 4.4) |   |

The viabilities for each of the media are identical.

The total and living populations are higher for the branched maltodextrins than for saccharose (sucrose).

Depending on the saccharide added, the viable cell concentrations are more concentrated than the saccharose (sucrose) control, the branched maltodextrins being the saccharides that activate growth most.

EXAMPLE 4

Variation in Saccharide Concentration

Experiments were carried out under the same conditions as previously, but with a mixture of branched maltodextrins and standard maltodextrins as well as a variation in the concentrations of maltodextrins.

The standard maltodextrin used is GLUCIDEX®96 marketed by the Applicant.

| Branched maltodextrin (%) | Standard maltodextrin (%) | Detection time (h) |
|---|---|---|
| 6 | 4 | 4.1 |
| 10 | 0 | 4.2 |

The use of mixtures of branched and standard maltodextrins allows the beneficial effect of the branched maltodextrin on the lactic fermentation to be maintained while adding a nutritional property to the dairy product (fibre effect). The standard maltodextrins seem to have a synergistic effect with the branched maltodextrins.

In conclusion, the carbon-containing additive according to the invention imparts several major benefits to the yoghurts:

enrichment in fibres increase in creaminess, which allows savings of dairy proteins increase in acidification rate and increase in the microbial concentration.

We claim:

1. In a process for preparing a fermented food composition by the action of foodstuff fermenting agents on a fermentation medium, the improvement consisting of adding to said fermentation medium a carbon-containing additive which comprises 2 to 90% by weight of branched maltodextrins having between 15 and 35% of 1→6 glucosidic bonds, a reducing sugars content less than 20%, a polymolecularity index less than 5 and a number average molecular mass Mn equal to at most 4,500 g/mole, whereby the growth of said foodstuff fermenting agents and the rate of acidification of said fermentation medium are increased.

2. Process according to claim 1, wherein said additive contains 5 to 85% by weight of the said branched maltodextrins.

3. Process according to claim 1, wherein the said additive further contains 5 to 75% by weight of standard maltodextrins.

4. Process according to claim 1, wherein said additive contains 5 to 55% by weight of standard maltodextrias.

5. Process according to claim 1, wherein said food composition is a dairy specialty.

6. Process according to claim 1, wherein said food composition is a fermented milk.

* * * * *